United States Patent
Tschirhart (10) Patent No.: US 10,270,917 B2
(45) Date of Patent: Apr. 23, 2019

(54) METHOD AND SYSTEM FOR ROUTING OF INBOUND TOLL-FREE COMMUNICATIONS

(71) Applicant: Level 3 Communications, LLC, Broomfield, CO (US)

(72) Inventor: David A. Tschirhart, Dale, TX (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/851,297

(22) Filed: Sep. 11, 2015

(65) Prior Publication Data

US 2017/0078495 A1    Mar. 16, 2017

(51) Int. Cl.
| | | |
|---|---|---|
| *H04W 40/04* | (2009.01) | |
| *H04L 12/66* | (2006.01) | |
| *H04L 29/12* | (2006.01) | |
| *H04M 15/00* | (2006.01) | |
| *H04M 15/08* | (2006.01) | |

(52) U.S. Cl.
CPC ....... *H04M 15/8044* (2013.01); *H04M 15/08* (2013.01); *H04M 15/09* (2013.01); *H04W 40/04* (2013.01)

(58) Field of Classification Search
CPC ....... H04L 45/00; H04L 45/304; H04L 45/42; H04Q 3/0045; H04Q 3/0025; H04M 3/42306; H04M 15/8044; H04M 15/00; H04M 7/14; H04M 15/08; H04M 15/14; H04W 40/04
USPC ....... 455/406, 411, 414.1, 445, 560; 379/36, 379/88.3, 352
See application file for complete search history.

(56) References Cited

U.S. PATENT DOCUMENTS

| | | | |
|---|---|---|---|
| 6,748,064 B2 | 6/2004 | Zbib | |
| 8,180,039 B2* | 5/2012 | Bedingfield, Sr. | ............. H04M 3/42306 |
| | | | 379/220.01 |
| 8,570,873 B2* | 10/2013 | Lawson | ............. G06F 9/505 |
| | | | 370/235 |
| 8,848,890 B2 | 9/2014 | Gupta et al. | |

(Continued)

OTHER PUBLICATIONS

International Search Report dated Nov. 7, 2016, Int'l Appl. No. PCT/US16/043162, Int'l Filing Date Jul. 20, 2016; 3 pgs.

(Continued)

*Primary Examiner* — Khawar Iqbal (57) ABSTRACT

Aspects of the present disclosure involve systems, methods, computer program products for consolidating toll-free features of two or more telecommunications networks. In one implementation, the network services may be consolidated through utilization of an Enhanced Feature Server (EFS) or other type of application server deployed in a telecommunications network. The EFS may be configured to receive a toll-free communication and route the communication based on the dialed toll-free number and a carrier identification code (CIC) associated with the communication. Routing the communication based at least on the CIC associated with the communication allows the telecommunications network to consolidate (and ultimately remove) a redundant network or network components from the telecommunications network to improve the operation of the network. In circumstances where a CIC is not associated with a communication, the EFS may associate a CIC with the communication for routing.

12 Claims, 6 Drawing Sheets

(56) References Cited

U.S. PATENT DOCUMENTS

| | | | |
|---|---|---|---|
| 8,908,850 B2 | 12/2014 | Allen | |
| 9,247,043 B1* | 1/2016 | Schaff | H04M 3/42306 |
| 2010/0158201 A1* | 6/2010 | Vijay Marathe | H04M 3/42306 |
| | | | 379/36 |
| 2010/0202446 A1* | 8/2010 | McCann | H04L 45/00 |
| | | | 370/352 |
| 2013/0010932 A1* | 1/2013 | Bajpay | H04M 3/42306 |
| | | | 379/32.01 |
| 2013/0177142 A1* | 7/2013 | Allen | H04Q 3/0045 |
| | | | 379/88.03 |
| 2014/0269679 A1* | 9/2014 | Gillis | H04M 15/49 |
| | | | 370/352 |
| 2015/0103991 A1* | 4/2015 | Albert | H04M 3/56 |
| | | | 379/202.01 |
| 2015/0296436 A1* | 10/2015 | Terpstra | H04L 61/106 |
| | | | 455/445 |
| 2015/0350426 A1* | 12/2015 | Huang | H04M 3/44 |
| | | | 455/414.1 |
| 2015/0358459 A1* | 12/2015 | Spievak | H04M 3/436 |
| | | | 379/201.12 |
| 2015/0381547 A1* | 12/2015 | Mandanapu | H04L 51/24 |
| | | | 709/206 |
| 2016/0142447 A1* | 5/2016 | Mufti | H04L 65/1046 |
| | | | 370/260 |
| 2018/0020102 A1* | 1/2018 | Aldworth | H04M 15/8061 |
| 2018/0027129 A1* | 1/2018 | Sharma | G06F 16/24573 |
| | | | 379/112.09 |

OTHER PUBLICATIONS

Written Opinion of the International Searching Authority dated Nov. 7, 2016, Int'l Appl. No. PCT/US16/043162, Int'l Filing Date Jul. 20, 2016; 5 pgs.

International Preliminary Report on Patentability dated Mar. 13, 2018, Int'l Appl. No. PCT/US16/043162, Int'l Filing Date Jul. 20, 2016; 7 pgs.

* cited by examiner

METHOD AND SYSTEM FOR ROUTING OF INBOUND TOLL-FREE COMMUNICATIONS

FIELD OF THE DISCLOSURE

Embodiments of the present invention generally relate to systems and methods for implementing a telecommunications network, and more specifically to consolidate toll-free services provided by two or more telecommunication networks while minimizing the impact seen by the customers of the network from the consolidation.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide toll-free communications in which a called customer may pay for all long-distance telephone calls made to the customer or customer's network. In general, toll-free communications allow a customer to the network to receive calls from disparate locations around the country without passing the cost of such long-distance calls to callers to the customer.

In addition, many telecommunication companies, through acquisitions and mergers with other telecommunication entities, may maintain distinct networks for providing such toll-free services to customers of the company. However, managing distinct networks provide several challenges to the telecommunication company. For example, provisioning procedures for each network may be different requiring network managers for the telecommunication company to learn the different provisioning procedures. In addition, each network may provide different features for the company's customers, but all such features may not be available in every region of the network footprint. Thus, to provide such services to the customers, the network managers may route communications from one distinct network to the other, which may in turn consume valuable network resources. Thus, it is often advantageous to combine, as much as possible, distinct networks into a single managed network when additional networks or network resources are obtained through such acquisitions.

It is with these and other issues that various aspects of the present disclosure were developed.

SUMMARY

One implementation of the present disclosure may take the form of a telecommunications network. The network comprises at least one application server for receiving communications from a plurality of telecommunication networks, the at least one application server comprising instructions stored thereon that, when executed by the at least one application server, perform several operations. Such operations may include receiving an incoming communication comprising a dialed telephone number associated with a client of the telecommunications network and a carrier identification code (CIC), obtaining the dialed telephone number and the CIC from the incoming communication, identifying a destination device of the client of the telecommunication network, the destination device in communication with at least one of the plurality of telecommunication networks, and transmitting the incoming communication to the destination device of the client of the telecommunication network through the at least one of the plurality of telecommunication networks Another implementation of the present disclosure may take the form of a feature server of a telecommunications network. The feature server comprises a network interface to receive a plurality of incoming communications from a plurality of telecommunication networks, at least one incoming communication comprising a dialed telephone number associated with a client of the telecommunications network and a carrier identification code (CIC) and a processing device in communication with a routing table database comprising a correlation of the dialed telephone number and the CIC from the at least one incoming communication with a destination device of the client of the telecommunication network, the processing device identifying the destination device of the client of the telecommunication network based at least on the dialed telephone number and the CIC from the at least one incoming communication. The feature server also includes a transmitting component for transmitting the at least one incoming communication to the destination device of the client of the telecommunication network through at least one of the plurality of telecommunication networks.

Yet another implementation of the present disclosure may take the form of a method for operating a telecommunications network. The method includes the operations of receiving an incoming communication at least one application server for receiving communications from a plurality of telecommunication networks, the incoming communication comprising a dialed telephone number associated with a client of the telecommunications network and a carrier identification code (CIC) and obtaining the dialed telephone number and the CIC from the incoming communication. The method further includes the operations of identifying a destination device of the client of the telecommunication network, the destination device in communication with at least one of the plurality of telecommunication networks and transmitting the incoming communication to the destination device of the client of the telecommunication network through the at least one of the plurality of telecommunication networks.

DETAILED DESCRIPTION

Aspects of the present disclosure involve systems, methods, computer program products, and the like, for consolidating toll-free features of two or more telecommunications networks. In one implementation, the network services may be consolidated through utilization of an Enhanced Feature Server (EFS) or other type of application server deployed in a telecommunications network. The EFS may be configured to receive a toll-free communication and route the communication based on the dialed toll-free number and a carrier identification code (CIC) associated with the communication. The CIC associated with the communication may identify a previous telecommunications network to which a customer is connected. By routing the communication in this manner, the EFS may identify the customer from the dialed toll-free number and a particular network connection from the CIC. Further, routing the communication based at least on the CIC associated with the communication allows the telecommunications network to consolidate (and ultimately remove) a redundant network or network components from the telecommunications network to improve the operation of the network. Also, routing the communication based at least on the CIC associated with the communication improves previously considered operations to consolidate such redundant networks or components. In circumstances where a CIC is not associated with a communication, the EFS may associate a CIC with the communication for routing. The assigned CIC may be a default CIC or may consider load balancing between available network connections when assigning the CIC. In other implementations, other identifiers associated with the communication, such as originating or destination Internet Protocol (IP) address, originating or destination Trunk Group (TG) address, and the like, may be used to route the toll-free communication and consolidate two or more networks providing toll-free services.

Figure 1:
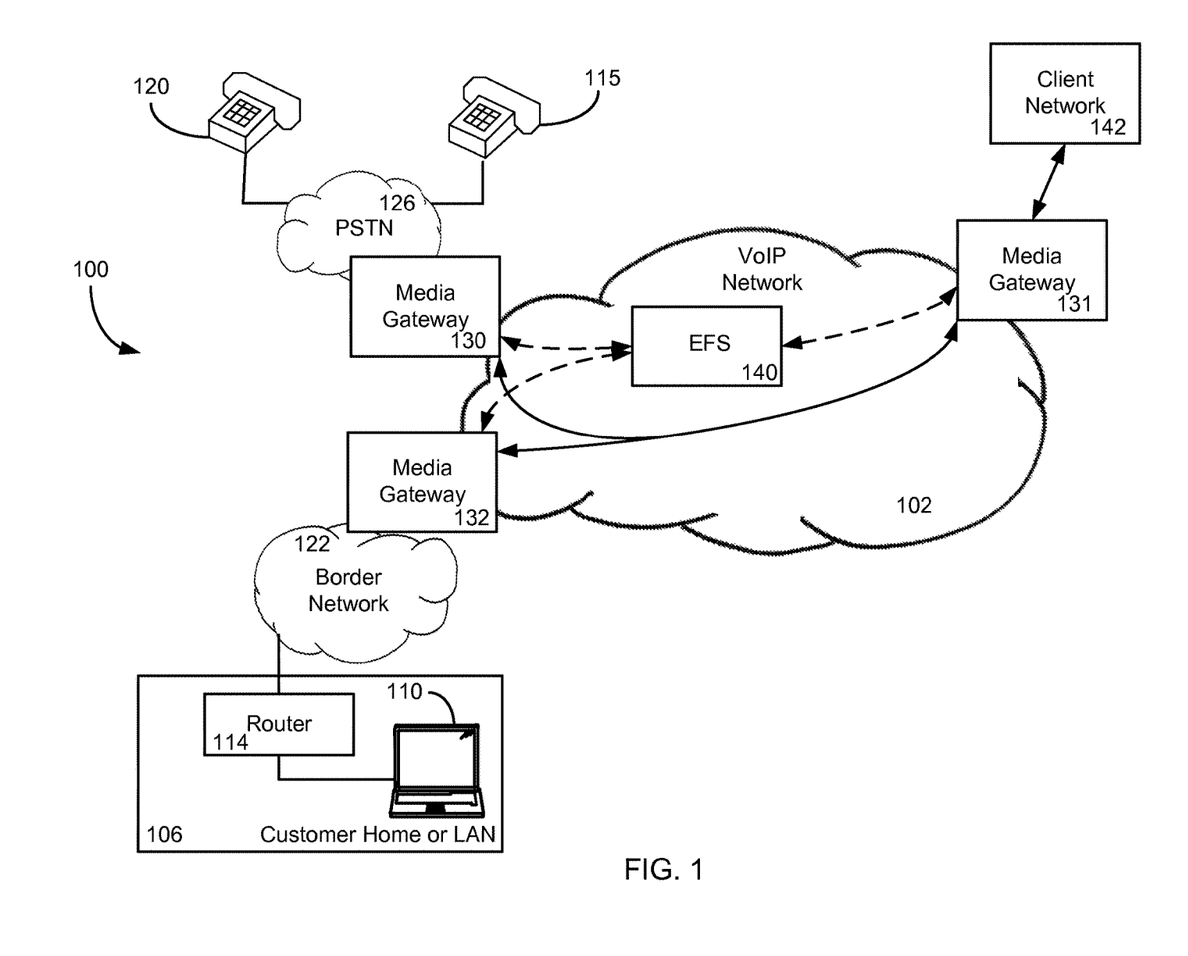
FIG. 1 schematic diagram illustrating a telecommunications network operating environment in accordance with one embodiment of the present disclosure.

FIG. 1 illustrates an exemplary operating environment 100 for providing toll-free services to one or more customers of a telecommunications network. The environment 100 provides for establishing communication sessions between network users. With specific reference to FIG. 1, the environment 100 includes a VoIP network 102, which may be provided by a network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any telecommunication network devices known or hereafter developed.

The VoIP network 102 includes numerous components such as, but not limited to gateways, routers, and registrars, which enable communication across the VoIP network 102, but are not shown or described in detail here because such devices and network configurations are readily understand by those of skill in the particular art. More relevant to this description is the interaction and communication between the VoIP network 102 and other entities, such as the one or more customer home or business local area networks (LANs) 106, where a user of the network will connect with the network and, more particularly, an EFS 140 instantiated in the network.

Customer network 106 can include communication devices such as, but not limited to, a personal computer or an IP-based telephone device 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer. Other communication devices 115,120 (such as analog telephones or other communication devices) may connect to the network 102 through a public switched telephone network (PSTN) for providing communications to the network.

The customer network 106 typically connects to the VoIP network 102 via a border network 122 or access network, such as one provided by an Internet Service Provider (ISP). The border network 122 is typically provided and maintained by a business or organization such as a local telephone company or cable company. The border network 122 may provide network/communication-related services to their customers. In contrast, the communication device 120,115 accesses, and is accessed by, the VoIP network 102 via the PSTN 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a user of the network 102 utilizes one or more of the communication devices to transmit a communication to the network. For example, the user may place a telephone call to the network 102 from a telephone 120 associated with the network through the PSTN 126 and media gateway 130. In another example, the user may place a telephone call to the network 102 from an IP-based communication device 110 associated with the network through the border network 122 and the media gateway 132. Upon receipt, the network 102 routes the communication to a routing device 140 or routing devices integrated within the network 102. In one example, the routing device may be an EFS 140 type device. In one particular embodiment, the EFS 140 is a virtual machine embodied on one or more computing devices in the network 102. For example, the virtual EFS 140 may be embodied on one or more application servers integrated into the network 102. It should be appreciated that the virtual EFS 140 may be a part of the network 102, may be separate from the network, or may have portions deployed in the network and out of the network. In addition, the EFS 140 may be resident on one or more components of the VoIP network 140, including several instances of the EFS 140 integrated throughout the network 102. Thus, although only a single instance of an EFS 140 is illustrated in FIG. 1, any number of routing devices may be present in the network 102. The operation of the EFS 140 in relation to received communications is discussed in more detail below.

Figure 2:
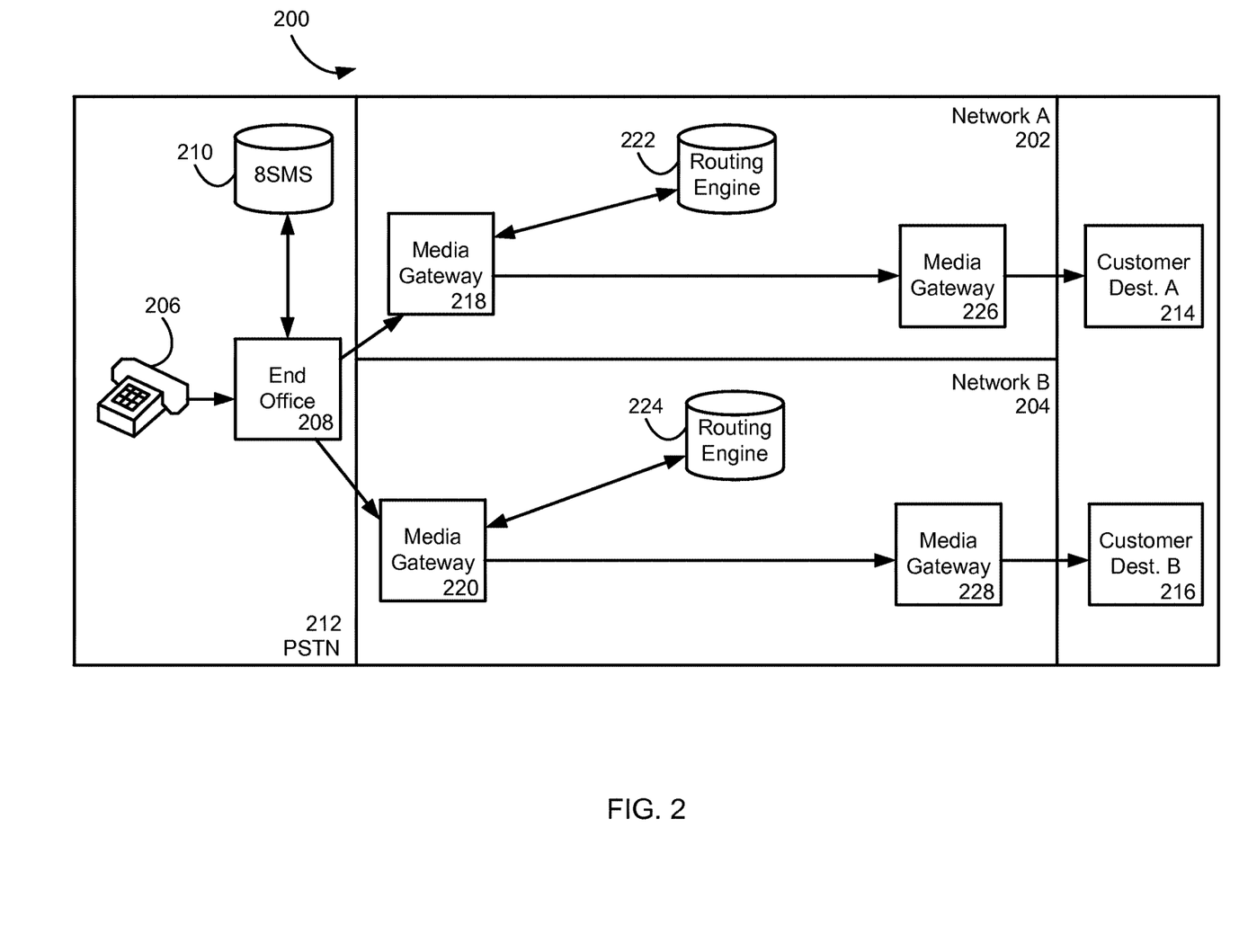
FIG. 2 is a schematic diagram illustrating two portions of the telecommunications network for providing toll-free communication services to one or more customers of the network.

As discussed above, a telecommunications company may operate more than one such telecommunications network as that illustrated in FIG. 1. For example, FIG. 2 is a schematic diagram illustrating two telecommunications networks that may be managed by a telecommunications company for providing toll-free communication services to one or more customers of the company. Although discussed as two distinct networks, it should be appreciated that the networks 202, 204 may be portions of an overall telecommunications network 200 that are distinct in that each network may include features or provisioning protocols that are unique to the individual network. In one example, network A 202 may be obtained by a first telecommunications company through an acquisition of another telecommunications company, while network B 204 is the original network developed by the telecommunications network. As such, network A 202 may include a first set of features and provisioning procedures developed by the acquired company while network B 204 may include a second set of features and provisioning procedures developed by the telecommunications company. However, both networks 202, 204 may be integrated or otherwise considered a portion of an overall telecommunications network 200 of the telecommunications company.

As should be appreciated, the telecommunications network 200 of FIG. 2 includes the same or similar components as that described above with reference to FIG. 1. For example, the network 200 includes a PSTN 212 operated by one or more LECs. The PSTN 212 includes at least one communication device 206 for originating and receiving a communication of the network 200. In one particular implementation, a user of the communication device 206 originates a toll-free communication by dialing a toll-free number with the communication device. The communication is transmitted to an end office 208 that is configured to route local communications to one or more long-distance networks 202, 204. In the example of a toll-free communication, the end office 208 may access a database 210 of toll-free communication information, referred to herein as the "8SMS" database, to determine to which long-distance network 202, 204 the communication is routed.

In general, the 8SMS database 210 receives the dialed toll-free number from the end office 208 and returns a CIC the database associates with the dialed number. The CIC, in general, identifies which long-distance network 202, 204 the communication is to be routed by the end office 208. In this manner, the database 210 translates the dialed number into a CIC for transmission along a long-distance network. Further, the 8SMS database 210 may also perform some processing of the dialed number to determine the CIC to provide to the end office 208 in return. For example, customer destination A 214 and customer destination B 216 may be managed by the same customer entity but may receive communications from the network 200 at different locations or through different egress trunks (illustrated in FIG. 2 by customer destination A connecting to network A 202 and customer destination B connecting to network B 204). Further, either customer destination A 214 or customer destination B 216 may be reached with the same dialed toll-free number. To provide this feature to the customer, the 8SMS database 210 may be configured to provide a CIC to the end office 208 based on more than just the dialed number. In one example, the database 210 may be programmed to return a first CIC if the origination location is from a first area and a second CIC if the origination location of the communication is from a second area. In another example, the 8SMS database 210 may perform a load balancing feature for all incoming communications for a customer to spread out the communications over the customer's destinations 214, 216. In this example, the 8SMS database 210 may alternate between providing different CICs to the end office 208 to spread out the incoming communications. Regardless of the operations performed, the 8SMS database 210 determines which CIC to return to the end office 208 in response to receiving a dialed toll-free number and transmits the CIC to the end office for further routing of the communication.

Depending on which CIC is returned, the end office 208 connects the communication to the media gateway 218 of network A 202 or the media gateway 220 of network B 204. Although illustrated in FIG. 2 and discussed below as being transmitted to either network A 202 or network B 204, it should be appreciated that the communication is routed to any number of networks within the overall telecommunications network 200. Further, although illustrated as being separate networks 202, 204, it should be appreciated that the networks are only separated logically within the telecommunications network 200 such that one or more of the components of the networks may be shared for routing communications through the network 200.

Upon receiving a communication from the PSTN 212, the ingress media gateway 218, 220 queries a routing engine 222, 224 to determine how to route the communication through the respective network 292, 204. In general, the routing engine 222, 224 is configured to receive one or more communications, determine a destination customer, a destination network, or communication device to which the toll-free communication is intended, and provide a translation of the incoming communication into a destination address associated with the network. In one embodiment, the communication is associated with a particular client or customer of the network 200 such that a destination address for the communication can be determined from the incoming communication. Thus, the routing engine 222, 224 may include a database that correlates information included with the toll-free communication with a destination network 214, 216. The routing engine 222, 224 may then respond to receiving the communication by providing one or more instructions to re-route the communication to a corresponding egress media gateway 226, 228. In a Session Initiation Protocol (SIP) based network, the routing engine 222, 224 may provide one or more SIP contacts to route the communication to the egress media gateway 226, 228. In response, the ingress media gateway 218, 220 transmits the communication to an egress media gateway 226, 228 associated with the client destination 214, 216 for connection with the client network. Once connected, the originating communication device 206 and the destination customer 214, 216 may exchange communications through the network 200.

As mentioned above, the routing engine 222, 224 for each of the networks 202, 204 route a toll-free communication based on the dialed telephone number. In particular, the routing engine 222 for network A 202 may route the communication to customer destination A 214 based on the dialed telephone number associated with the customer destination. Similarly, the routing engine 224 for network B 204 may route the communication to customer destination B 216 based on the dialed telephone number associated with the customer destination. Further, in some implementations of the network 200, a disaster recovery feature may be provided to a customer. In such an implementation, each routing engine 222, 224 may be configured to route the toll-free communication when received at the network. The 8SMS database 210 may be programmed to route a received communication for the customer to network A 202. However, if network A 202 becomes unavailable for some reason, the 8SMS database 210 may be reconfigured to route received communications for the customer to network B 204. Because the routing engine 224 for network B 204 may also route the incoming communication to the customer, a backup network or transmission path through the network 200 is provided in instances of one of the transmission paths being unavailable for transmission of the communication.

Figure 3A:
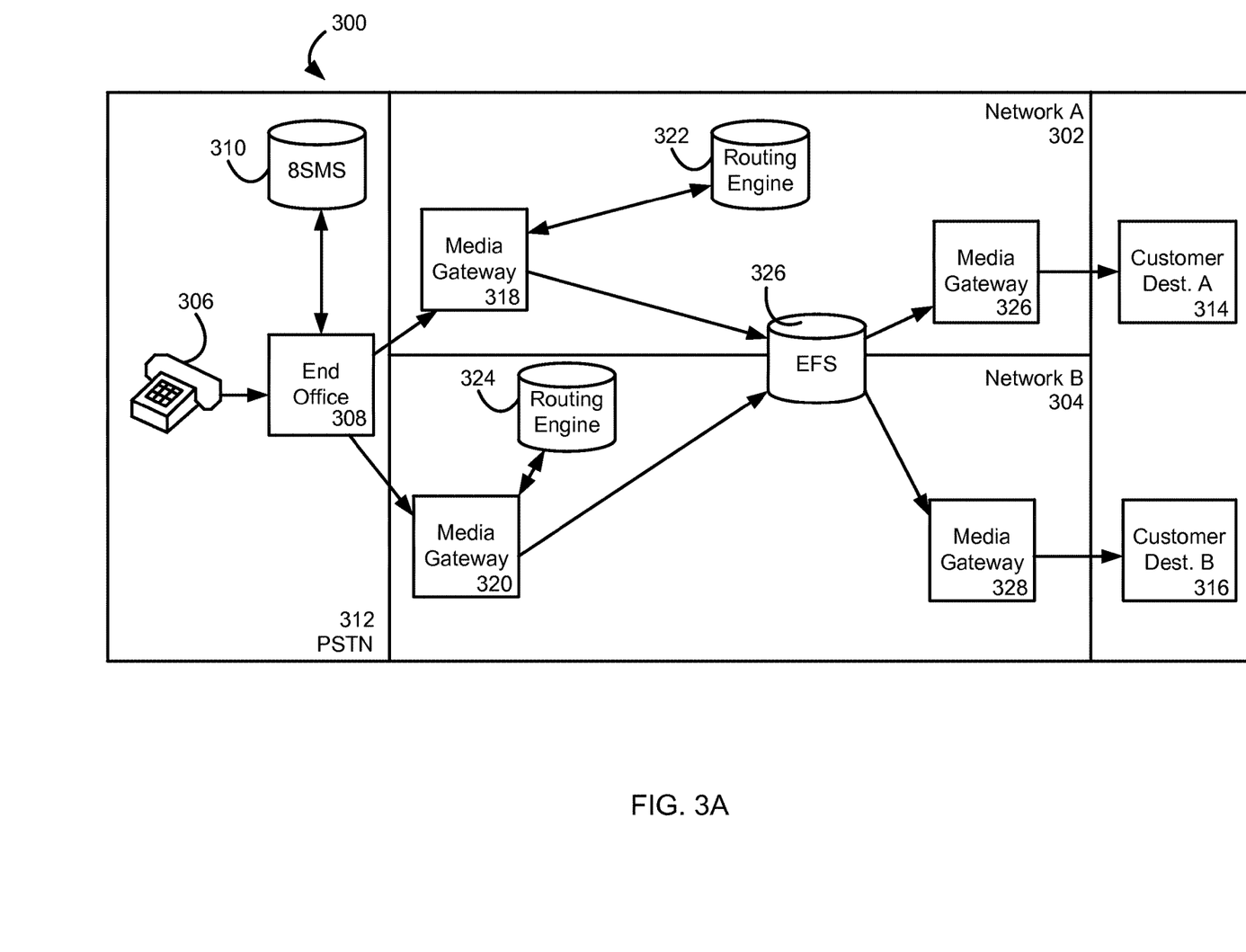
FIG. 3A is a schematic diagram illustrating a telecommunications network configuration utilizing a shared component to consolidate two or more telecommunications networks for providing toll-free communication services to one or more customers of the network.

As also mentioned above, it may be beneficial to some networks to consolidate distinct networks 202, 204 managed or maintained by the same entity. For example, FIG. 3A is a schematic diagram illustrating a telecommunications network configuration 300 utilizing a shared component 326 to consolidated two or more telecommunications networks for providing toll-free communication services to one or more customers of the network. The components of the network 300 of FIG. 3 are similar in operation to those described above with reference to FIG. 2. However, in this implementation, the routing engines 322, 324 route incoming toll-free communications to a shared application server, or EFS 326. To transmit the received toll-free communications to the EFS 326, the routing engines 322, 324 may be configured by a network 300 manager to route the communications to the EFS based on the dialed telephone number of the communication. The EFS 326, in turn, may route the received communications to the respective egress media gateway 326, 328 also on the dialed telephone number and, in some instances, apply one or more toll-free features to the communication. Further, in one implementation described in more detail below, the EFS 326 may consider a CIC associated with the communication to determine to which egress media gateway 326, 328 the communication is routed.

In general, all toll-free communications received on either network 302, 304 may be routed to the shared EFS 326 regardless of the CIC returned by the 8SMS database 310. Thus, the shared EFS 326 may be a component of the overall telecommunications network 300 managed by a telecommunications company that is accessible by both network A 302 and network B 304 to route communications. By routing toll-free communications to the shared EFS 326, the networks 302, 304 may be collapsed into a single managed telecommunications network 300. In other words, through the shared EFS 326, communications received through network A 302 may be provided to network B 304, and vice versa. Several methods for the EFS 326 to handle the communications from the networks in communication with the EFS are described below. Further, although discussed herein with reference to toll-free communications, it should be appreciated that any type of communications transmitted through a telecommunications network 300 may be routed to the shared EFS 326 for further routing by the EFS to consolidate the two networks. Also, although illustrated and discussed as consolidating two networks, it should also be appreciated that any number of distinct networks may be in communication with the shared EFS 326 for consolidating any number of networks into an overall managed telecommunications network 300.

In general, the shared EFS 326 routes communications from network A 302 and network B 304. Thus, the EFS 326 may maintain one or more routing tables for routing communications. In one implementation, the EFS 326 routes a received communication to an end destination based on the dialed telephone number associated with communication. For example, if the dialed telephone number is associated with customer destination A 314, the EFS 326 routes the communication to media gateway 326 for connection to customer destination A. To route the communication, the EFS 326 may store or otherwise have access to the routing information from the routing engine 322 of network A 302 and the routing engine 324 of network B 304. However, as mentioned above, the telecommunications network 300 may provide for transmitting a toll-free communication through either network A 302 or network B 304, such as in the case where a disaster recovery feature is provided to a customer. This circumstance may create a conflict in the EFS 326 when routing the received communication. Several approaches to resolving this conflict in the routing of the communication through the EFS 326 are thus provided and described below.

In one implementation, duplicate entries in the routing database maintained by the EFS 326 may be noted and one of the duplicated entries may be removed. For example, both the routing engine 322 of network A 302 and the routing engine 324 of network B 304 may include an entry on where to route a received communication with a dialed telephone number. Thus, when the databases from the routing engines 322, 324 are combined, the combined database may have two entries for that particular dialed telephone number. To resolve this conflict, the EFS 326 may select which destination (either from customer destination A 314 or customer destination B 316) to route the received communication. However, this approach may include the telecommunications company contacting each customer to the network 300 to notify them of the change to the routing of received communications. In addition, this approach may also remove some disaster recovery functionality from the network 300 such that the approach is not preferred by the telecommunications company.

In another approach, the EFS 326 may be configured to run or execute two separate applications, one to route communications received from network A 302 and the other to route communications received from network B 304. The routing databases for the networks 302, 304 may be maintained and provisioned separately to remove the possibility of conflict between the routing databases. However, such an approach may be processor intensive for the EFS 326 and may be difficult when provisioning the networks.

In a third approach, the EFS 326 may be configured to route received communications based on the dialed telephone number and the CIC associated with the communication. In this implementation, the routing database maintained or accessed by the EFS 326 may not need to be altered from the combination of the routing engine information from the networks 302, 304. Rather, the EFS 326 may utilize the CIC of the communication to determine which of the distinct networks 302, 304 the communication should be routed through. For example and referring to the network 300 of FIG. 3A, a toll-free communication is received at the end office 308 of the PSTN 312 from the communication device 306. As explained above, the end office 308 receives a CIC 310 associated with the dialed number from the 8SMS database 310. Based on the received CIC, the end office 308 transmits the communication to network A 302 or network B 304. Once on either network, the communication may then be routed to the shared EFS 326 once the corresponding routing engine 322, 324 recognizes the communication as a toll-free communication. Also, the communication may include the dialed telephone number and the CIC that was returned from the 8SMS database 310.

The EFS 326 may route the communication to customer destination A 314 or customer destination B 316. However, in the circumstance where the same dialed telephone number is shared between the customer destinations 314, 316, the EFS 326 may include two entries in the routing database for routing based on the telephone number. In this implementation, however, the EFS 326 may then utilize the CIC of the communication to determine which customer destination to route the communication. In particular, if the CIC of the communication is associated with network A 302, the EFS 326 may determine the communication is intended for customer destination A 314. Similarly, if the CIC of the communication is associated with network B 304, the EFS 326 may determine the communication is intended for customer destination B 316. In this manner, the EFS 326 maintains the separate networks 302, 304 while also allowing for a consolidation of the two networks, as explained in more detail below. By routing the communication based on the CIC received from the 8SMS database 310, the EFS 326 may route the communication to the proper customer destination from the originally intended network, even though the networks share the routing through the EFS. Further, the communication is received by the customer in the same manner as before such that the customer experience is maintained.

Figure 3B:
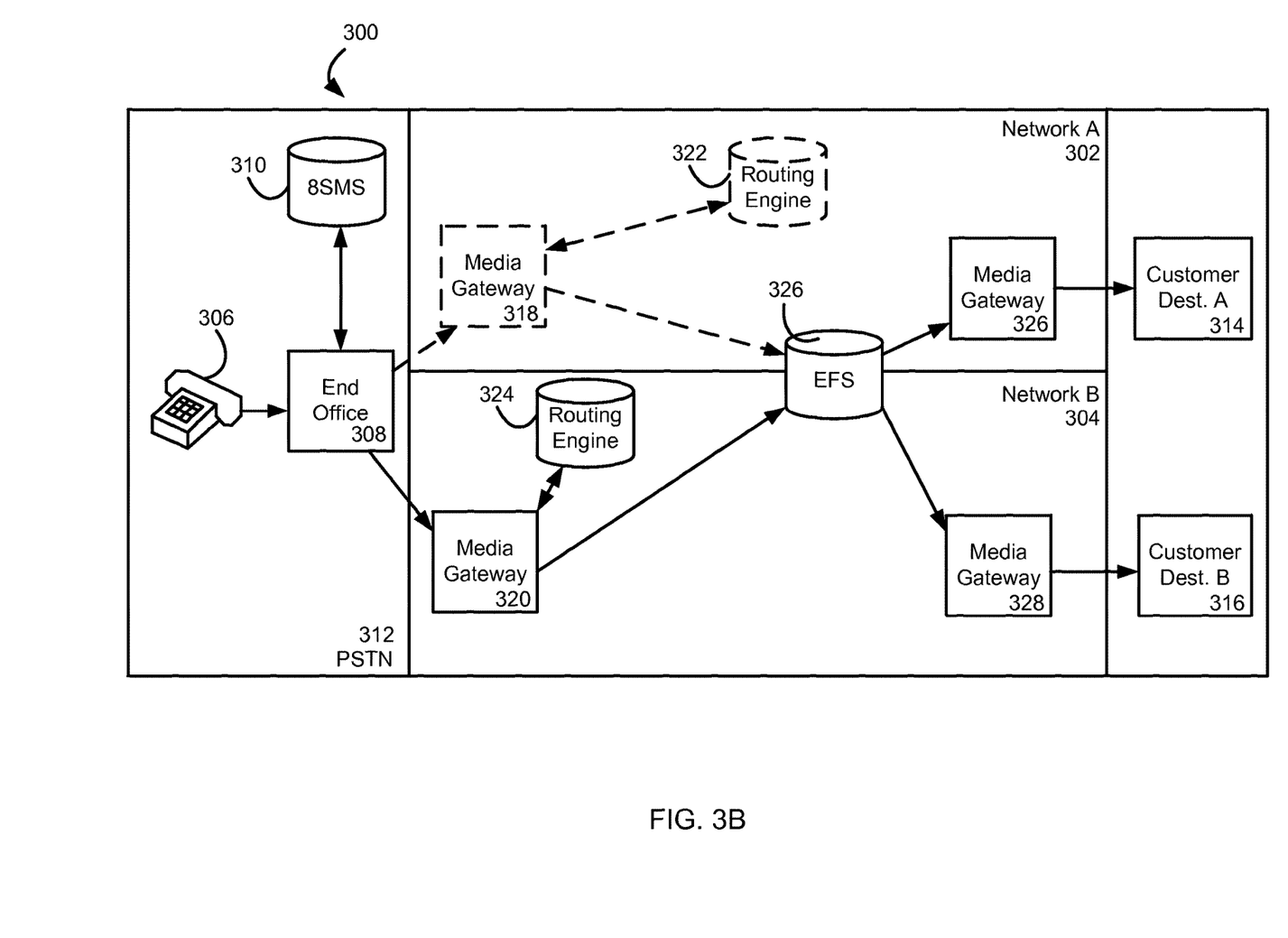
FIG. 3B is a schematic diagram illustrating a consolidated telecommunications network for providing toll-free communication services to one or more customers of the network.

In addition to maintaining the experience for the customer, utilizing the CIC and dialed telephone number to route communications through the EFS 326 allows the network 300 manager to consolidate or otherwise streamline the network. For example, FIG. 3B is a schematic diagram illustrating a consolidated telecommunications network for providing toll-free communication services to one or more customers of the network. In particular, through the use of the shared EFS 326 component, one or more of the components of network A 302 may be removed or otherwise decommissioned from the network. This may reduce the overall size of the network 300 to be managed allowing for a more streamlined and, in some cases, more efficient network.

As described above, the EFS 326 routes communications based on the dialed telephone number and the CIC in one implementation. In general, the EFS 326 utilizes the CIC to determine from which network the communication is received. However, through a configuration of the 8SMS database 310 and the end office 308, portions of the network 300 may be removed. For example, the 8SMS database 310 may be configured to return a first CIC for toll-free communications intended for customers to network A 302 and a second CIC for toll-free communications intended for customers to network B 304. The end office 308, however, may be configured to route all communications with the first CIC and the second CIC to network B 304. Thus, regardless of which CIC is returned by the 8SMS database 310, the end office 308 transmits the communication to the media gateway 320 for network B 304. Because the communication is a toll-free communication, the communication is then routed to the EFS 326. In turn, the EFS 326 may route the communication based on the CIC associated with the communication. Thus, although all toll-free communications may come to the EFS 326 through network B 304, those communications intended for customer destination A 314 may be transmitted through the media gateway 326 for network A 302 to the end customer 314.

Because the end office 308, in this implementation, is configured to route communications for the first CIC and the second CIC to network B 304, the media gateway 318 and routing engine 322 of network A 302 may be removed from the network 300. In one example, the media gateway 318 and routing engine 322 may be physically removed from the network 300. In other examples, the media gateway 318 and routing engine 322 may be logically removed from the flow of communications through the network or may otherwise remain connected within the network 300 but may be re-deployed for other communication flows through the network. Regardless of the component use within the network 300, the shared EFS 326 allows for the consolidation of network A 302 and network B 304 within the overall network 300 to streamline or improve the efficiency of communication flows through the network.

In some instances, the toll-free communication received by either network A 302 or network B 304 may not have an associated CIC. In particular, the 8SMS database 310 may return a CIC for the communication, however, the end office 308 may not be configured to route such communications without the CIC to either network A 302 or network B 304. For example, the end office 308 may not be programmed to route the particular CIC to a connected network. Thus, in one implementation, the EFS 326 may assign a default CIC to the communication for further routing to either the media gateway 326 of network A 302 or media gateway 328 of network B 304. In other words, the EFS 326 is configured to select a network to transmit toll-free communications that do not have an associated CIC. In general, any destination network may be the default network and a corresponding CIC may be associated with the communication for routing.

Figure 4:
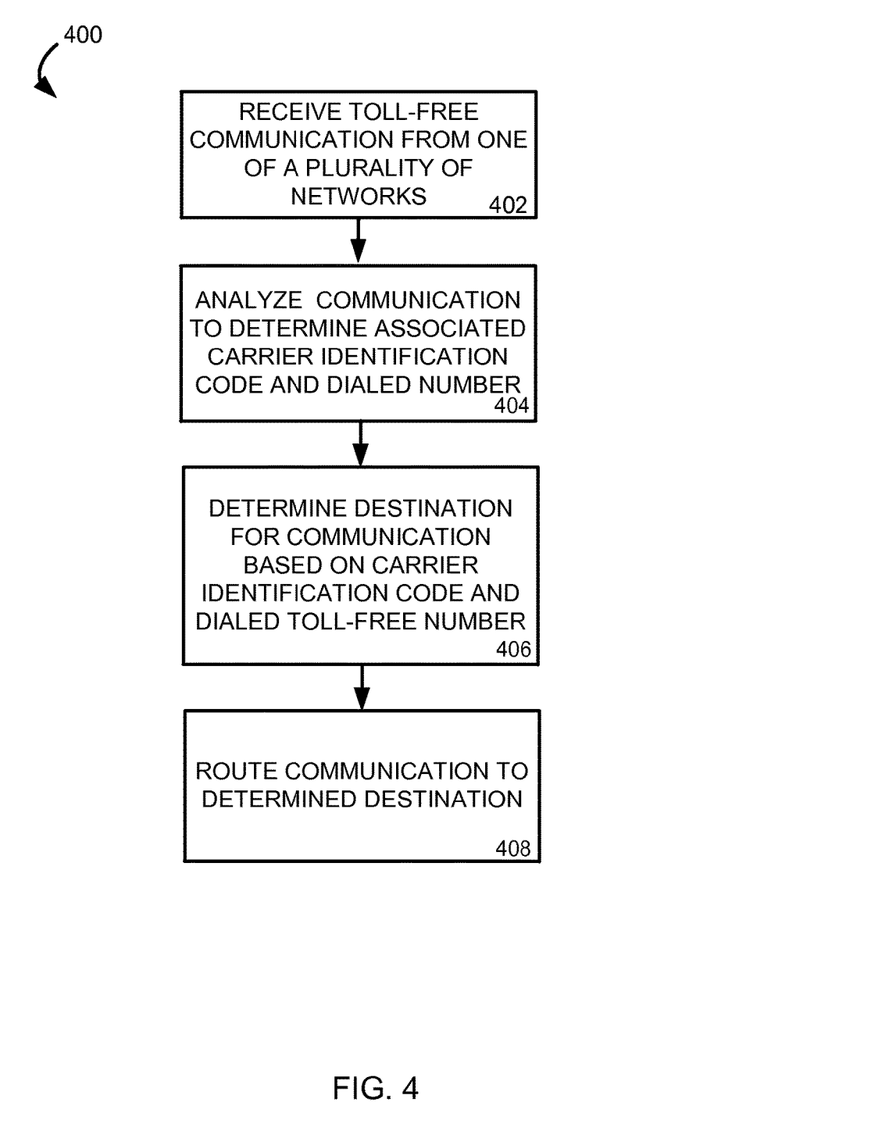
FIG. 4 is a flowchart illustrating a method for a networking device for routing a communication utilizing a carrier identification code associated with the communication

FIG. 4 is a method for a networking device for routing a communication utilizing a carrier identification code associated with the communication. In one implementation, the operations of the method may be performed by an EFS 326 device of a telecommunications network. However, it should be appreciated that one or more of the operations of the method 400 may be performed by any component of the telecommunications network. Further, the operations may be performed through the execution of one or more software instructions, through one or more hardware circuits or components designed to perform the operations, or a combination of both hardware and software components.

Beginning in operation 402, the EFS 326 receives a toll-free communication from one of a plurality of telecommunication networks. For example, network A 302 of the telecommunications network 300 of FIG. 3 may transmit the communication to the EFS 326 as described above. Alternatively, network B 304 may transmit the communication to the EFS 326. In operation 404, the EFS 326 analyzes the received communication to determine an associated CIC of the communication. The CIC may be associated with the communication by the 8SMS database 310 or the end office 308 upon receipt in a connected PSTN 312 as described above.

In operation 406, the EFS 326 associates the CIC and the destination toll-free number of the communication with a customer destination device, address, or trunk group. In general, the EFS 326 may maintain a database of CICs, dialed telephone numbers, and destinations for communications. By obtaining the dialed telephone number and CIC from the communication and associating the dialed telephone number and CIC to a destination, the EFS 326 may route the communication to the determined destination in operation 408. In one particular implementation, the EFS 326 may utilize a default CIC for those communications without an associated CIC. In this manner, the shared EFS 326 may receive communications from either network A 302 or network B 304 and route the communication to the desired destination. In addition, by routing the communication based at least on the CIC and the dialed toll-free number, the networks 302, 304 may be consolidated into one managed telecommunications network as each toll-free communication of the network is routed through the shared EFS 326.

Figure 5:
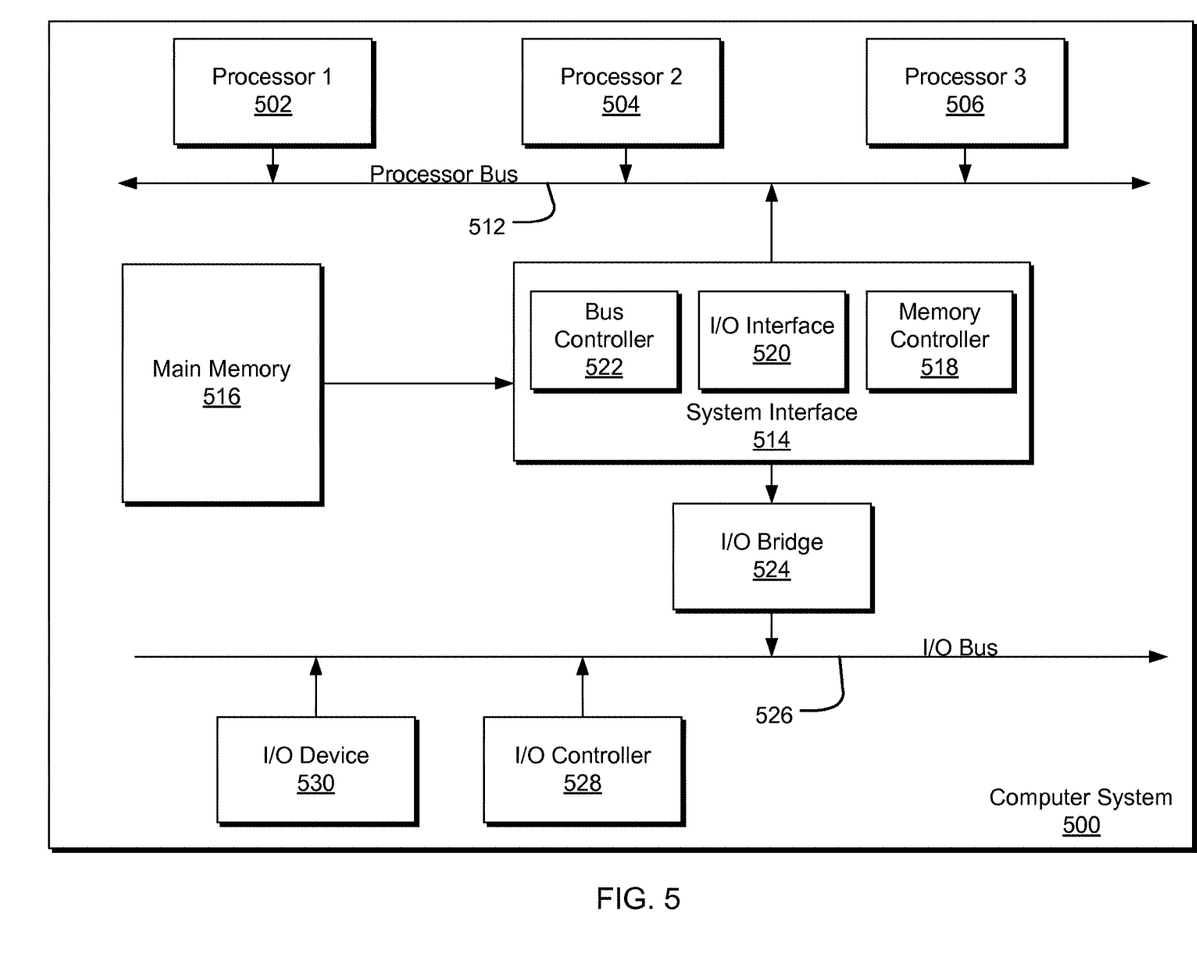
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be used to implement the various components of the EFS 326 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A system comprising:
an application server operatively connected to at least first and second telecommunication networks, the application server comprising instructions stored thereon that, when executed by the application server, perform the operations of:
receiving, by the application server, a first incoming communication comprising i) a dialed telephone number associated with a client of the first telecommunications network and ii) a first carrier identification code (CIC) that identifies a first carrier associated with the first telecommunications network;
obtaining the dialed telephone number and the first CIC from the first incoming communication;
identifying, based on the first CIC and the dialed telephone number, a first destination device of the client, the first destination device in communication with at least the first telecommunication network;
transmitting the first incoming communication to the first destination device of the client through the at least the first telecommunication network;
receiving, by the application server, a second incoming communication comprising i) the dialed telephone number associated with the client and ii) a second CIC that identifies a second carrier associated with the second telecommunications network;
obtaining the dialed telephone number and the second CIC from the second incoming communication;
identifying, based on the second CIC and the dialed telephone number, a second destination device of the client, the second destination device in communication with at least the second telecommunication network;
transmitting the second incoming communication to the second destination device of the client through the at least the second telecommunication network; and storing a routing table from the first and second telecommunication networks in a routing table database, wherein the routing table comprises a correlation of the dialed telephone number and the first and second CICs from the first and second incoming communications.

2. The system of claim 1 wherein the first incoming communication is a toll-free communication.

3. The system of claim 1 wherein the second telecommunication network is logically separate from the first network.

4. The system of claim 1 wherein the application server further performs the operation of associating a default CIC with a third incoming communication, the default CIC associated with the first telecommunication network.

5. A feature server of a telecommunications network comprising:
- a network interface to receive a plurality of incoming communications from at least first and second telecommunication networks, at least a first incoming communication comprising i) a dialed telephone number associated with a client of the first telecommunications network and ii) a first carrier identification code (CIC) identifying a first carrier associated with the first telecommunications network, and at least a second incoming communication comprising i) the dialed telephone number and ii) a second CIC identifying a second carrier associated with the second telecommunications network;
- a processing device in communication with a routing table database comprising a correlation of the dialed telephone number and the first CIC with a first destination device of the client and of the dialed telephone number and the second CIC with a second destination device of the client, the processing device identifying the first destination device of the client based at least on the dialed telephone number and the first CIC from the first incoming communication and identifying the second destination device of the client based at least on the dialed telephone number and the second CIC from the second incoming communication; and
- a transmitting component for transmitting the first incoming communication to the first destination device of the client and for transmitting the second incoming communication to the second destination device of the client.

6. The feature server of claim 5 wherein the first incoming communication is a toll-free communication.

7. The feature server of claim 5 wherein the second telecommunication network is logically separate from the first network.

8. The feature server of claim 5 wherein the processing device further stores a routing table from at least the first telecommunication network in the routing table database.

9. The feature server of claim 5 wherein the processing device further associates a default CIC with a third incoming communication, the default CIC associated with the first telecommunications network.

10. A method comprising:
- receiving, by an application server operatively connected to at least first and second telecommunication networks, a first incoming communication, the first incoming communication comprising La dialed telephone number associated with a client of a first telecommunications network and ii) a first carrier identification code (CIC) that identifies a first carrier associated with the first telecommunications network;
- obtaining the dialed telephone number and the first CIC from the first incoming communication;
- identifying, based on the first CIC and the dialed telephone number, a first destination device of the client, the first destination device in communication with at least the first telecommunication network;
- transmitting the first incoming communication to the first destination device of the client through the at least the first telecommunication network;
- receiving, by the application server, a second incoming communication comprising i) the dialed telephone number associated with the client and ii) a second CIC that identifies a second carrier associated with the second telecommunications network;
- obtaining the dialed telephone number and the second CIC from the second incoming communication;
- identifying, based on the second CIC and the dialed telephone number, a second destination device of the client, the second destination device in communication with at least the second telecommunication network;
- transmitting the second incoming communication to the second destination device of the client through the at least the second telecommunication network; and
- storing a routing table from the at least one of the first and second telecommunication networks in a routing table database, wherein the routing table comprises a correlation of the dialed telephone number and the first and second CICs from the first and second incoming communications.

11. The method of claim 10 wherein the first incoming communication is a toll-free communication.

12. The method of claim 10 further comprising:
- associating a default CIC with a third incoming communication, the default CIC associated with the first telecommunications network.

* * * * *